United States Patent
Pancotti

Patent Number: 5,135,357
Date of Patent: Aug. 4, 1992

[54] MAIN HELICOPTER ROTOR

[75] Inventor: Santino Pancotti, Gallarate, Italy

[73] Assignee: Agusta S.p.A., Samarate, Italy

[21] Appl. No.: 681,149

[22] Filed: Apr. 5, 1991

[30] Foreign Application Priority Data

Apr. 6, 1990 [IT] Italy ................... 67261 A/90

[51] Int. Cl.⁵ .................................. B63H 1/06
[52] U.S. Cl. ..................... 416/131; 416/134 A; 416/140; 416/141; 416/244 R; 416/500
[58] Field of Search ............ 416/134 A, 141, 140, 416/244 R, 131, 244 C, 244 D, 500

[56] References Cited

U.S. PATENT DOCUMENTS

| | | | |
|---|---|---|---|
| 2,233,747 | 3/1941 | Riedl | 416/244 D X |
| 4,251,187 | 2/1981 | Hollrock | 416/141 X |
| 4,297,078 | 10/1981 | Martin | 416/141 X |
| 4,306,836 | 12/1981 | Mayerjak | 416/141 X |
| 4,323,332 | 4/1982 | Fradenburgh | 416/148 X |
| 4,361,415 | 11/1982 | Aubry | 416/134 A |
| 4,580,945 | 4/1986 | Miller | 416/140 A X |
| 4,915,585 | 4/1990 | Guimbal | 416/140 |

Primary Examiner—Edward K. Look
Assistant Examiner—Todd Mattingly
Attorney, Agent, or Firm—Kane, Dalsimer, Sullivan Kurucz, Levy, Eisele and Richard

[57] ABSTRACT

A main helicopter rotor having a number of blades and wherein a drive shaft supports, at its top end, an annular hub integral with the drive shaft and in turn supporting, via a spherical elastomeric joint having its center on the axis of the drive shaft, and an elastic axial suspension, a toroidal body surrounding the drive shaft. Each blade is connected to the hub by a connecting element extending through both the hub and the toroidal body, and connected respectively to the same by a first and second spherical elastomeric bearing.

8 Claims, 3 Drawing Sheets

MAIN HELICOPTER ROTOR

BACKGROUND OF THE INVENTION

The present invention relates to a main helicopter rotor. In particular, the present invention relates to a rotor of the type comprising a drive shaft designed to turn about its axis; a hub integral with the drive shaft; a number of blades extending substantially radially outwards from the hub and each having a connection device for connection to the hub; a pitch change device connected to each said connecting device; and means for connecting each said connecting device to the hub, said connecting means comprising a first spherical elastomeric bearing located between a respective connecting device and the hub and defining the focal point of a respective blade.

Known rotors of the aforementioned type are generally referred to as "semirigid", wherein each said connecting device comprises a respective elastic element located between the hub and a respective blade, and designed to absorb both the loads due to centrifugal force and part of the shearing stress. The main drawback of known rotors of the aforementioned type is the failure of said elastic elements, normally consisting of metal blades integral at one end with the hub and extending radially outwards of the same, to meet the conflicting requirements of relatively low rigidity when the rotor is operative, and relatively high rigidity when the rotor is idle and possibly subjected to wind. In addition to being deformable in flight, in response to the shear exerted on the respective blades, so as to generate the required control moments, said elastic elements are also called upon to support the blades in the correct position in relation to the ground when the rotor is idle.

As such conflicting requirements are rarely, if ever, achievable in actual practice, for supporting the blades when the rotor is idle, known rotors of the aforementioned type usually feature mobile supporting elements of the type normally employed on so-called "articulated" rotors.

A further point to note in connection with known "semirigid" rotors of the aforementioned type is that cyclic and collective pitch control of the blades depends on the torsional deformability of said elastic elements, which must be relatively long for maintaining within acceptable limits the stress exerted by the pitch change controls. As a consequence of the above, the diameter and, therefore, drag of the hub on known rotors of the aforementioned type are usually considerable.

SUMMARY OF THE INVENTION

The aim of the present invention is to provide a rotor of the aforementioned type designed to enable the elimination of mobile members for supporting the blades when the rotor is idle.

A further aim of the present invention is to provide a rotor of the aforementioned type featuring a hub which is both relatively straightforward in design and of relatively small diameter.

With this aim in view, according to the present invention, there is provided a rotor of the aforementioned type, characterised by the fact that said connecting means also comprise a toroidal body surrounding said hub; a spherical elastomeric joint and an elastic axial suspension, both located between said toroidal body and said hub for interconnecting the same; and a second spherical elastomeric bearing between each said connecting device and said toroidal body; said spherical elastomeric joint having its center on said axis.

On the rotor as described above, said center is preferably a fixed point on said axis, said axial suspension being located between said spherical elastomeric joint and said toroidal body.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
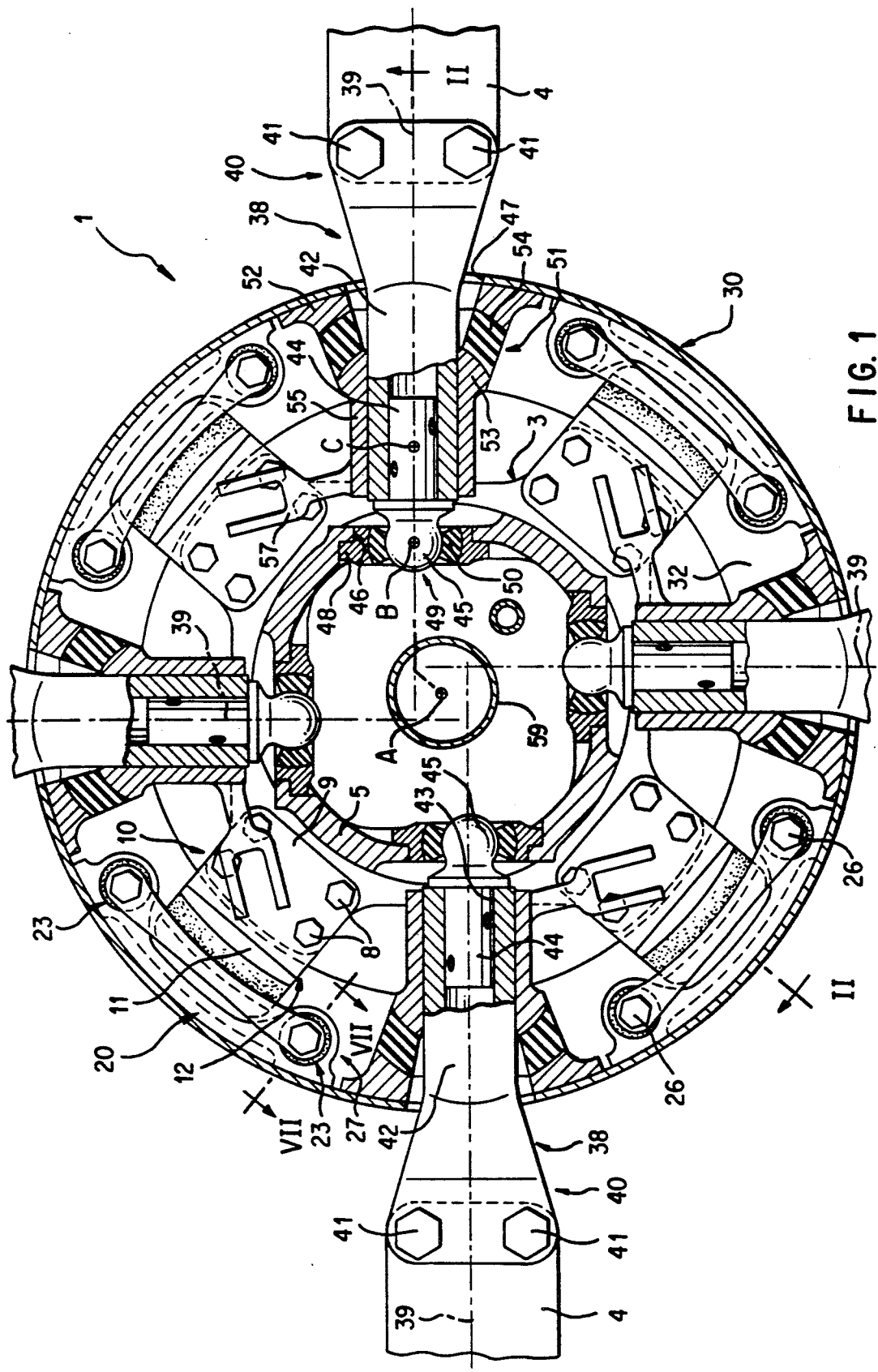
FIG. 1 shows a partially sectioned plan view, with parts removed for simplicity, of a preferred embodiment of the helicopter rotor according to the present invention.
Figure 2:
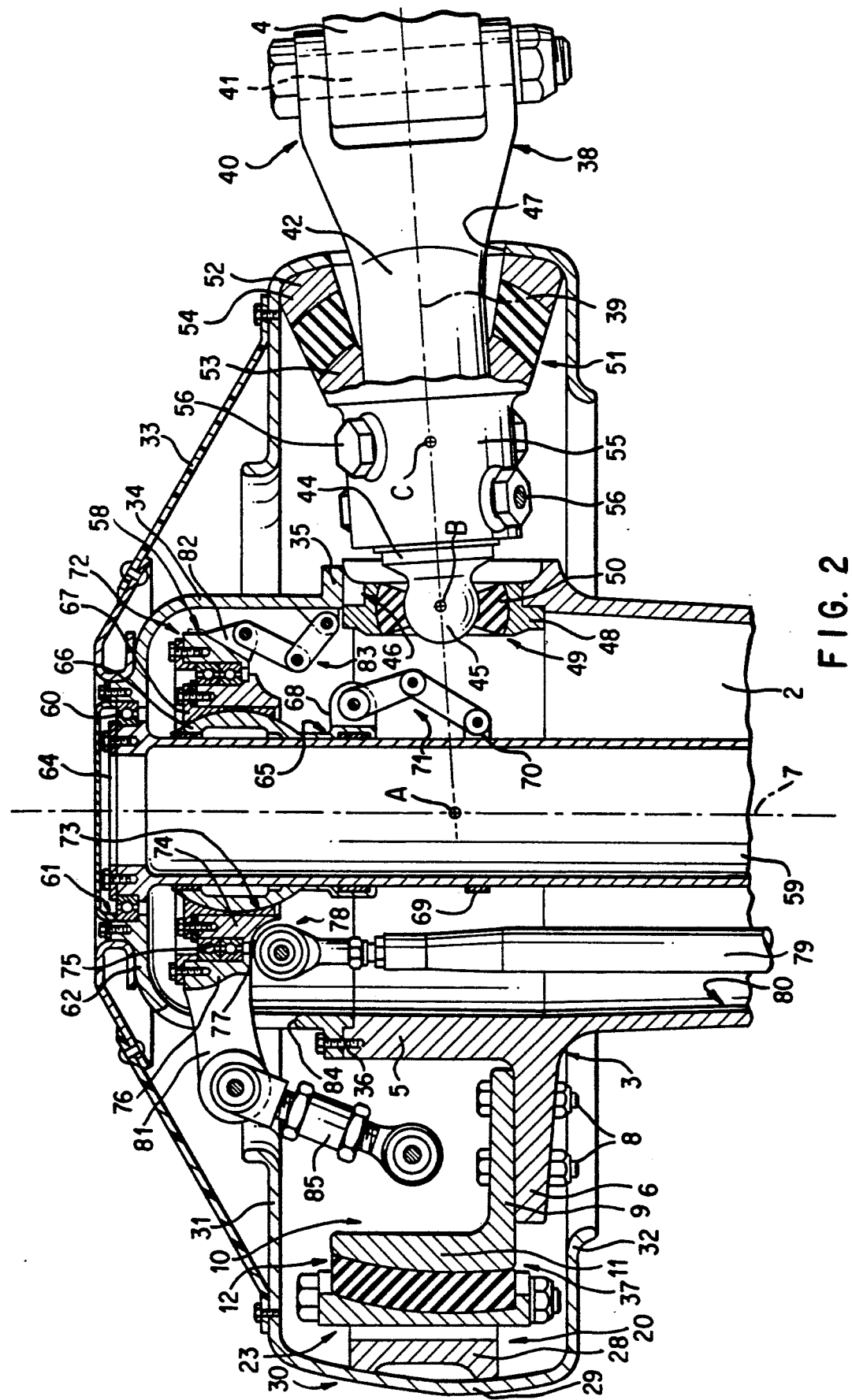
FIG. 2 shows a section along line II—II in FIG. 1.

Number 1 in FIGS. 1 and 2 indicates a main rotor of a helicopter (not shown). Rotor 1 comprises a tubular drive shaft 2 extending substantially vertically and connected angularly at the bottom end to the output of a reduction gear casing (not shown) in turn connected to the output of the helicopter drive (not shown).

As shown in FIG. 2, the top portion of shaft 2 consists of a hub 3 for connecting to shaft 2 a number of blades 4 extending substantially radially outwards from hub 3. Hub 3 comprises an annular element 5 integral with shaft 2, and a number of flat plates 6, each constituting an outer radial appendix of annular element 5 and lying in a plane perpendicular to axis 7 of shaft 2 and through the bottom end of annular element 5.

Plates 6 are equally spaced about shaft 2, are equal in number to blades 4 and are each fitted, on the upper surface and via bolts 8, with an arm 9 of a respective substantially L-shaped bracket 10, the second arm 11 of which extends outwards of the outer radial end of respective plate 6 and upwards, substantially parallel to axis 7.

Figure 3:
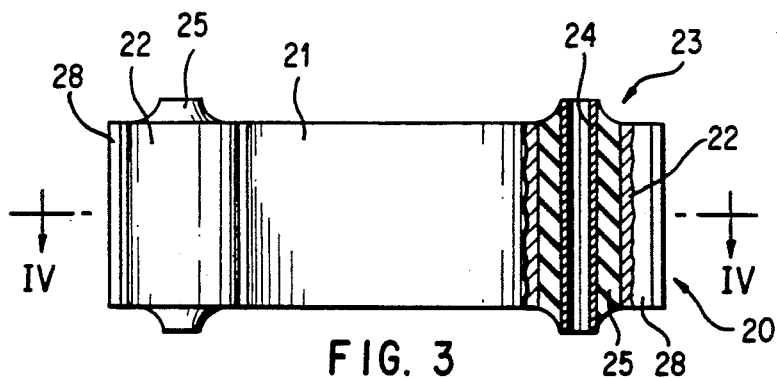
FIG. 3 shows a larger-scale, partially sectioned side view of a first detail in FIG. 2.
Figure 5:
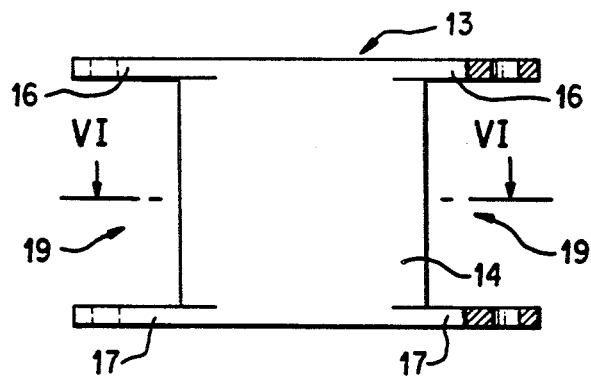
FIG. 5 shows a view of a second detail in FIG. 2.
Figure 6:
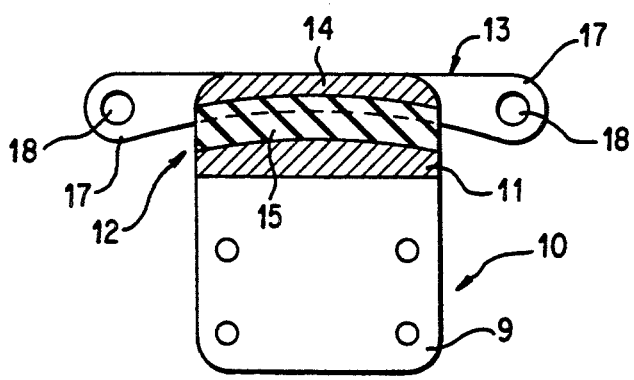
FIG. 6 shows a section along line VI—VI in FIG. 5.

Arm 11 constitutes the inner shoe of a respective spherical elastomeric bearing 12, the center A of which coincides with the centers of the other bearings 12 and is located on axis 7 and the outer shoe of which consists of a substantially flat element 13 (shown in detail in FIG. 5) comprising a central plate 14 facing the outer surface of respective arm 11 and connected to the same via the interposition of a spherical-dome-shaped layer 15 of reinforced elastomeric material. Each element 13 also comprises two substantially aligned arms 16 extending in opposite directions from the top end of plate 14; and two substantially aligned arms 17 extending in opposite directions from the bottom end of plate 14. Each pair of arms 16 and 17 located over each other on the same side of plate 14 present respective through holes 18 aligned along a respective axis substantially parallel to axis 7, and define a respective fork 19 cooperating with the other fork 19 of element 13 for connecting element 13 to a respective bracket 20 shown in detail in FIG. 3.

Each bracket 20 comprises a central plate 21 placed on the outside of plate 14 of element 13, and is fitted on each end with a cylindrical coupling 22 shorter than the distance between arms 16 and 17 of forks 19. The two couplings 22 of each bracket 20 are inserted, coaxially with respective holes 18, between arms 16 and 17 of respective forks 19 on element 13, and constitute the outer shoes of respective axial elastomeric bearings 23, the respective inner shoes of which are defined by a cylindrical inner coupling 24 coaxial with respective coupling 22 and connected to the same via the interposition of a cylindrical coupling 25 of reinforced elastomeric material.

Figure 7:
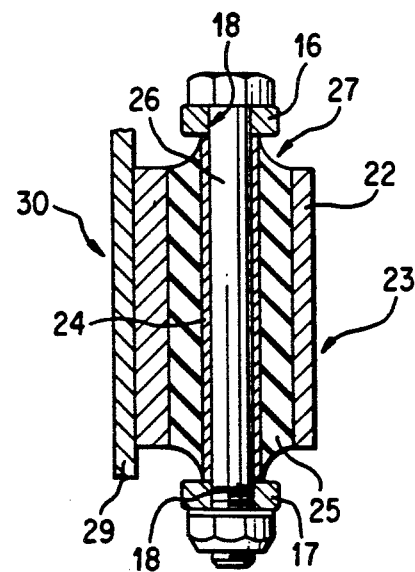
FIG. 7 shows a larger-scale section along line VII—VII in FIG. 1.

As shown more clearly in FIG. 7, each coupling 24 is longer than respective coupling 22 and equal in length to the distance between arms 16 and 17 of respective fork 19, to which it is connected by a bolt 26 extending along coupling 24 and through holes 18 for securing arms 16 and 17 against the opposite ends of coupling 24. Each bracket 20 is thus connected to respective element 13 via an elastic axial suspension 27 acting substantially parallel to axis 7 and consisting of said two axial elastomeric bearings 23.

Figure 4:
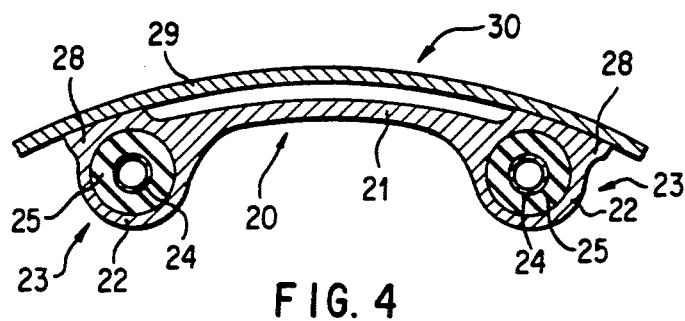
FIG. 4 shows a section along line IV—IV in FIG. 3.

As shown in FIG. 4, on the opposite side to that facing plate 14, each coupling 22 presents radial shoulders 28 (FIG. 2) by which respective bracket 20 is rendered integral with the inner surface of an intermediate annular portion 20 of a toroidal body 30 preferably made of composite synthetic material and extending about shaft 2 substantially coaxial with axis 7.

As shown in FIG. 2, toroidal body 30 presents a substantially C-shaped section with its concave side facing axis 7, and, in addition to intermediate portion 29, comprises two annular flanges 31 and 32 extending inwards from the top and bottom ends of intermediate portion 29 and over and beneath suspensions 27 respectively. A deformable conical cover 33 extends upwards from flange 31 towards axis 7, for connecting toroidal body 30 to the top of a bell 34 coaxial with axis 7 and having a bottom flange 35 connected to the top end of hub 3 by a number of screws 36.

Toroidal body 30 is thus connected elastically to hub 3 so as to move axially in relation to shaft 2, by virtue of axial suspensions 27, and to rock about center A, located in a substantially fixed position on axis 7, by virtue of a spherical elastomeric joint 37 located between toroidal body 30 and hub 3 and defined by elastomeric bearings 12.

As shown particularly in FIG. 1, the inner end of each blade 4 is connected to hub 3 by a connecting element 38 extending substantially radially in relation to hub 3 along a respective axis 39 coinciding with the axis of respective blade 4. Each connecting element 38 comprises, on the outer end, a fork 40 connected to the inner end of respective blade 4 by two bolts 41 substantially parallel to axis 7, and, on the inner end, a rod 42 integral with fork 40 and having an axial dead hole 43 engaged by a cylindrical rod 44 projecting from hole 43 towards axis 7 and terminating in a spherical head 45 having its center B on axis 39.

Each connecting element 38 engages a substantially radial hole 46 formed through hub 3, between a respective pair of adjacent plates 6; and a substantially radial hole 47 formed through intermediate portion 29 of toroidal body 30, between a respective pair of brackets 20 and substantially aligned with respective hole 46 along respective axis 39.

Each hole 46 is engaged by the outer shoe 48 of a respective spherical elastomeric bearing 49, the inner shoe of which is defined by respective spherical head 45 connected to respective outer shoe 48 via a layer 50 of reinforced elastomeric material.

Each connecting element 38 is secured to toroidal body 30 by a further spherical elastomeric bearing 51 mounted with its concave side facing axis 7. Each bearing 51 presents its center C on respective axis 39, inside toroidal body 30, and comprises an annular outer shoe 52 connected integral with intermediate portion 29 and coaxial with respective hole 47; and an annular inner shoe 53 coaxial with respective axis 39 and connected to outer shoe 52 by an annular layer 54 of reinforced elastomeric material. Inner shoe 53 is integral with the end of a coupling 55 fitted on to respective rod 42 and fitted through with two diametrical bolts 56 perpendicular to each other and offset axially along coupling 55 for rendering coupling 55, respective rod 42 and respective rod 44 integral with one another. Coupling 55 also presents a substantially radial outer fork 57 for connecting respective blade 4 to a pitch change device indicated as a whole by 58.

As shown particularly in FIG. 2, device 58 comprises a tubular, substantially cylindrical shaft 59 fixed inside shaft 2 and connected integral, at the bottom end (not shown), with the casing (not shown) of said drive. The top end of shaft 59 extends inside bell 34 and, via the interposition of a bearing 60, engages a hole 61 formed through the center of end wall 63 of bell 34 and closed by cover 64.

Device 58 also comprises a cylindrical coupling 65 mounted in rotary and axially-sliding manner on to the portion of shaft 59 extending inside bell 34. The top portion of coupling 65 consists of an enlargement or head 66 defined externally by a spherical-crown-shaped surface 67, while the bottom portion of coupling 65 presents an outer radial tab 68.

Beneath coupling 65, shaft 59 is fitted integral with a further cylindrical coupling 69 having an outer radial tab 70 connected to tab 68 by a link 71 enabling axial displacement of coupling 65 along shaft 59, while at the same time preventing coupling 65 from rotating about the axis of shaft 59.

Device 58 also comprises a known "oscillating plate" assembly 72 supported on shaft 59 inside bell 34, and having a spherical central seat 73 connected to surface 67. As shown particularly in FIG. 2, assembly 72 comprises an inner ring 74, hereinafter referred to as the "fixed g", locked angularly in known manner (not shown) on to head 66 so as to oscillate in any direction in relation to head 66 and about the center of surface 67, but not to rotate about the axis of shaft 59. Fixed ring 74 is fitted in rotary manner, via the interposition of bearings 75, with an outer ring 76 hereinafter referred to as the "rotary ring."

From the bottom of fixed ring 74 there project radially outwards a number of forks 77 (only one of which is shown) equal in number to blades 4 and each fitted, by means of a respective spherical joint 78, with the top end of a respective pitch change control rod 79 extending downwards inside an annular gap 80 between the inner surface of shaft 2 and the outer surface of shaft 59.

From the outer surface of rotary ring 76 there project radially outwards a number of arms 81 (only one of which is shown) equal in number to blades 4; and a number of forks 82 (only one of which is shown) for connecting rotary ring 76 to bell 34 by means of a respective link 83.

Each arm 81 extends through a respective opening 84 outside bell 34, and is connected to a respective fork 57 by means of a respective connecting rod 85. The manner in which rods 79, oscillating plate assembly 72, arms 81, connecting rods 85 and forks 57 provide for varying the cyclic and collective pitch of blades 4 is known and therefore requires no further explanation.

Needless to say, the so-called "internal-transmission" device 58 described herein, i.e., featuring a fixed internal shaft 52, rods 79 and oscillating plate assembly 72 located substantially inside shaft 2, may be replaced, by any technician in this particular field, with a known so-called "external-transmission" pitch change device (not shown).

Some mention should be made, however, of certain structural and operating characteristics of the connection between blades 4 and hub 3.

The foremost structural characteristic of rotor 1 as described herein consists of toroidal body 30, which provides for achieving an extremely compact, aerodynamically "clean" rotor.

In fact, elastomeric bearings 12 constituting spherical elastomeric joint 37 provide for guiding toroidal body 30, as it travels in relation to hub 3, over a spherical surface having its center at A, while axial bearings 23 enable local transverse deformation of toroidal body 30 substantially parallel to axis 7 but also substantially tangent to said spherical surface having its center at A.

Consequently, even using a relatively small-diameter hub 3 involving a relatively small distance between the focal point B of each blade and center A and, theoretically, a relatively small control moment, rotor 1 provides, in actual fact, for achieving relatively substantial control moments by virtue of said local transverse deformation of toroidal body 30.

Said reduction in distance A−B, for a given control moment, provides for considerably reducing vibration of the rotor and, consequently, of the helicopter itself.

Distance A−B, in fact, is also proportional to the moments generated by the alternating shear transmitted by the blades and resulting from continual dissymmetry of the dynamic and aerodynamic forces applied to the same.

As regards stress transmission, elastomeric bearings 49 transmit to hub 3 part of the shear caused by both lift and drag. The centrifugal forces applied to blades 4, on the other hand, are transmitted by elastomeric bearings 51 to toroidal body 30 which, being substantially in the form of a closed ring, absorbs the centrifugal forces via internal compensation.

In connection with the above, it should be pointed out that the spherical design of elastomeric bearings 51 was selected to enable them, not only to transmit the centrifugal forces to toroidal body 30, but also, and equally importantly, to enable cyclic pitch change control of blades 4, to dampen the lead-lag movements of blades 4 in the plane perpendicular to axis 7, and to support blades 4 when the rotor is idle. Rotor 1 thus provides for dispensing with both external dampers and blade supporting devices which, in addition to complicating the overall structure of rotor 1, would also result in a substantial increase in aerodynamic drag.

Needless to say, the many functions bearings 51 are called upon to perform necessarily involve structural trade-offs. In fact, for a given size of rotor 1, an increase in distance B−C results in an increase in the resisting moment for supporting the blades when the rotor is idle, but also in a reduction in the radius of bearings 51 and, therefore, in their ability to withstand and transmit the centrifugal forces to toroidal body 30.

I claim:

1. A main helicopter rotor of the type comprising a drive shaft (2) designed to turn about its axis (7); a hub (3) integral with the drive shaft (2); a number of blades (4) extending substantially radially outwards from the hub (3) and each having a connection device (38) for connection to the hub (3); a pitch change device (58) connected to each said connecting device (38); and means for connecting each said connecting device (38) to the hub (3), said connecting means comprising a first spherical elastomeric bearing (49) located between a respective connecting device (38) and the hub (3) and defining the focal point (B) of a respective blade (4), characterised by the fact that said connecting means also comprise a toroidal body (30) surrounding said hub (3); a spherical elastomeric joint (37) and an elastic axial suspension (27), both located between said toroidal body (30) and said hub (3) for interconnecting the same; and a second spherical elastomeric bearing (51) between each said connecting device (38) and said toroidal body (30); said spherical elastomeric joint (37) having its center (A) on said axis (7).

2. A rotor as claimed in claim 1, characterised by the fact that said center (A) is a fixed point on said axis (7); said axial suspension (27) being located between said spherical elastomeric joint (37) and said toroidal body (30).

3. A rotor as claimed in claim 1, characterised by the fact that said toroidal body (30) presents a substantially C-shaped section with its concave side facing said axis (7).

4. A rotor as claimed in claim 1, characterised by the fact that said toroidal body (30) is made of composite synthetic material.

5. A rotor as claimed in claim 1, characterised by the fact that said spherical elastomeric joint (37) comprises a number of further spherical elastomeric joints (12) equally spaced about said axis (7) and having respective centers coinciding with one another and with said center (A); said further spherical elastomeric bearings (12) being equal in number to said blades (4).

6. A rotor as claimed in claim 5, characterised by the fact that each said further spherical elastomeric bearing (12) comprises an inner shoe (11) integral with said hub (3), and an outer shoe (14); said elastic axial suspension (27) comprising a number of axial elastomeric bearing means (20) arranged about and substantially parallel to said axis; each said outer shoe (14) being connected to said toroidal body (30) via the interposition of a respective said axial elastomeric bearing means (20).

7. A rotor as claimed in claim 6, characterised by the fact that each said axial elastomeric bearing means (20) comprises two axial elastomeric bearings (23) parallel to each other and located on opposite sides of said respective outer shoe (14).

8. A rotor as claimed in claim 1, characterised by the fact that each said second spherical elastomeric bearing (51) presents its center (C) between said respective focal point (B) and said toroidal body (30).

* * * * *